United States Patent
Kawakami et al.

(10) Patent No.: US 10,614,847 B2
(45) Date of Patent: Apr. 7, 2020

(54) MAGNETIC RECORDING MEDIUM

(71) Applicant: Maxell Holdings, Ltd., Otokuni-gun, Kyoto (JP)

(72) Inventors: Shinji Kawakami, Kyoto (JP); Toshio Hiroi, Kyoto (JP); Masao Fujita, Kyoto (JP)

(73) Assignee: MAXELL HOLDINGS, LTD., Kyoto (JP)

(*) Notice: Subject to any disclaimer, the term of this patent is extended or adjusted under 35 U.S.C. 154(b) by 289 days.

(21) Appl. No.: 15/855,412

(22) Filed: Dec. 27, 2017

(65) Prior Publication Data

US 2018/0182422 A1   Jun. 28, 2018

(30) Foreign Application Priority Data

Dec. 28, 2016 (JP) ................................ 2016-256260
Nov. 15, 2017 (JP) ................................ 2017-220176

(51) Int. Cl.
*G11B 5/714* (2006.01)
*G11B 5/706* (2006.01)
*G11B 5/70* (2006.01)

(52) U.S. Cl.
CPC ............... *G11B 5/714* (2013.01); *G11B 5/70* (2013.01); *G11B 5/70615* (2013.01); *G11B 5/70642* (2013.01)

(58) Field of Classification Search
None
See application file for complete search history.

(56) References Cited

U.S. PATENT DOCUMENTS

| 2012/0045664 A1 | 2/2012 | Tanaka et al. |
| 2014/0212693 A1 | 7/2014 | Hattori |
| 2015/0093600 A1 | 4/2015 | Hosoya |
| 2015/0111066 A1 | 4/2015 | Terakawa et al. |
| 2016/0104560 A1 | 4/2016 | Ohkoshi et al. |
| 2016/0180875 A1 | 6/2016 | Tanaka et al. |

(Continued)

FOREIGN PATENT DOCUMENTS

| JP | 08249640 A | * | 9/1996 |
| JP | 2008084419 A | * | 4/2008 |

(Continued)

OTHER PUBLICATIONS

Abstract translation of JP 2008-084419 A. (Year: 2008).*
Abstract Translation of JP 08-249640 A. (Year: 1996).*

*Primary Examiner* — Kevin M Bernatz
(74) *Attorney, Agent, or Firm* — Birch, Stewart, Kolasch & Birch, LLP

(57) ABSTRACT

In a magnetic recording medium according to the present invention, if a straight line W having a length of 500 nm and a width of 15 nm is displayed parallel to a width direction of the magnetic layer and a straight line L having a length of 500 nm and a width of 15 nm is displayed parallel to a longitudinal direction of the magnetic layer, the number of magnetic particles that intersect the straight line W is N1, and the number of magnetic particles that intersect the straight line L is N2, then, a relationship of N1/0.5>60 and N2/0.5>60 is established where N1/0.5 is the number of magnetic particles per micrometer obtained by dividing N1 by 0.5 μm and N2/0.5 is the number of magnetic particles per micrometer obtained by dividing N2 by 0.5 μm.

7 Claims, 1 Drawing Sheet

(56) References Cited

U.S. PATENT DOCUMENTS

2017/0040032 A1  2/2017  Hosoya
2017/0162220 A1  6/2017  Nakashio et al.

FOREIGN PATENT DOCUMENTS

| JP | 2012-43495 A | 3/2012 |
| JP | 2014-149888 A | 8/2014 |
| JP | 2014-224027 A | 12/2014 |
| JP | 2015-82329 A | 4/2015 |
| JP | 2015-91747 A | 5/2015 |
| WO | WO 2015/198514 A1 | 12/2015 |

* cited by examiner

MAGNETIC RECORDING MEDIUM

BACKGROUND OF THE INVENTION

1. Field of the Invention

The present invention relates to a high capacity magnetic recording medium having an excellent electromagnetic conversion property.

2. Description of Related Art

A coating-type magnetic recording medium provided with a magnetic layer containing magnetic powder and a binder on a nonmagnetic support body needs to have a higher recording density accompanying the transition of a recording reproduction method from an analog method to a digital method. In particular, a high-density digital video tape, a computer backup tape, and the like need to satisfy this increasing demand.

A recording wavelength is shortened accompanying such an increase in the recording density, and in order to support this short wavelength recording, attempts have been made to micronize magnetic powder year by year, and currently, ferromagnetic hexagonal ferrite powder having an average particle diameter of about 20 nm has been realized, and a magnetic recording medium using this magnetic powder has been practically used (for example, JP 2015-91747A).

Moreover, in order to further increase the recording density of the magnetic recording medium using the above-described ferromagnetic hexagonal ferrite powder, the ferromagnetic hexagonal ferrite powder needs to be further micronized. However, the volume of magnetic powder particles is reduced by further micronizing the ferromagnetic hexagonal ferrite powder, and there is a problem that the ferromagnetic hexagonal ferrite powder particles tend to be influenced by heat fluctuation. Thus, it is necessary to suppress heat fluctuation using a magnetic material having a high magnetic coercive force and a high anisotropy energy even though the magnetic material is micronized.

In such a circumstance, in recent years, $\varepsilon$-$Fe_2O_3$ has been studied as a new magnetic material for a magnetic recording medium, and iron oxide nano-magnetic particle powder constituted by a single phase of $\varepsilon$-$Fe_2O_3$ having a ferrite magnetic property and having an average particle diameter of 15 nm or less or preferably 10 nm or less has been proposed (for example, JP 2014-224027A). Also, a magnetic recording medium using $\varepsilon$-$Fe_2O_3$ as the magnetic powder has been proposed (for example, JP 2014-149886A, JP 2015-82329A, WO 2015/198514).

Also, JP 2012-43495A relating to a method for measuring spacing is an example of prior art documents related to the present invention.

The track density of a magnetic layer has been increased accompanying such a high recording density for increasing the capacity of a magnetic recording medium. However, the track width decreases accompanying an increase in the track density, and as a result, there is a problem in that the output property decreases and the electromagnetic conversion property also decreases.

The present invention was made in order to solve such a problem, and provides a magnetic recording medium having an excellent electromagnetic conversion property even though the track density is increased accompanying an increase in the recording density.

SUMMARY OF THE INVENTION

The magnetic recording medium of the present invention is a magnetic recording medium including a nonmagnetic support body and a magnetic layer containing magnetic particles, in which $0.0013\ \mu T \cdot m < Mr \cdot t < 0.0032\ \mu T \cdot m$ is satisfied where Mr is a residual magnetic flux density in a thickness direction of the magnetic layer and t is an average thickness of the magnetic layer, a squareness ratio in the thickness direction of the magnetic layer is 0.65 or more, if a straight line W having a length of 500 nm and a width of 15 nm is displayed parallel to a width direction of the magnetic layer and a straight line L having a length of 500 nm and a width of 15 nm is displayed parallel to a longitudinal direction of the magnetic layer, on an image obtained by observing a surface of the magnetic layer using a scanning electron microscope at 10 k-fold magnification, the straight line W does not intersect a particle having a particle diameter of 50 nm or more and a gap having a maximum width of 50 nm or more on the image, and on the image, the number of magnetic particles that intersect the straight line W is N1, and the straight line L does not intersect a particle having a particle diameter of 50 nm or more and a gap having a maximum width of 50 nm or more on the image, and on the image, the number of magnetic particles that intersect the straight line L is N2, then, a relationship of $N1/0.5>60$ and $N2/0.5>60$ is established where N1/0.5 is the number of magnetic particles per micrometer obtained by dividing N1 by 0.5 μm and N2/0.5 is the number of magnetic particles per micrometer obtained by dividing N2 by 0.5 μm.

According to a magnetic recording medium of the present invention, even though the track width is reduced due to an increase in the track density accompanying an increase in the recording density for increasing the capacity, it is possible to provide a magnetic recording medium having an excellent electromagnetic conversion property.

DETAILED DESCRIPTION OF THE INVENTION

Figure 1:
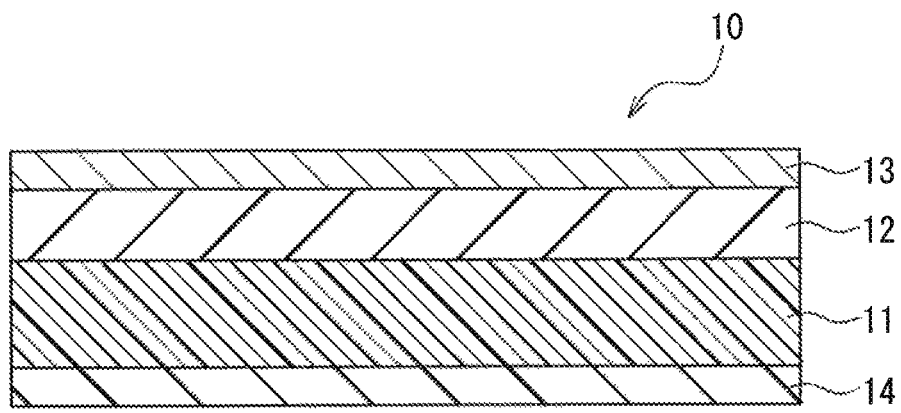
FIG. 1 is a schematic cross-sectional diagram showing one example of a magnetic recording medium.

An embodiment of a magnetic recording medium of the present invention will be described.

The magnetic recording medium of this embodiment includes a nonmagnetic support body and a magnetic layer containing magnetic particles. Also, $0.0013\ \mu T \cdot m < Mr \cdot t < 0.0032\ \mu T \cdot m$ is satisfied where Mr is a residual magnetic flux density in the thickness direction of the above-described magnetic layer and t is an average thickness of the magnetic layer, and a squareness ratio in the thickness direction of the magnetic layer is 0.65 or more. Furthermore, if a straight line W having a length of 500 nm and a width of 15 nm is displayed parallel to the width direction of the magnetic layer and a straight line L having a length of 500 nm and a width of 15 nm is displayed parallel to the longitudinal direction of the magnetic layer, on an image obtained by observing a surface of the magnetic layer using a scanning electron microscope at 10 k-fold magnification, the straight line W does not intersect particles having a particle diameter of 50 nm or more and gaps having a maximum width of 50 nm or more on the image, and on the image, the number of magnetic particles that intersect the straight line W is N1, and the straight line L does not intersect particles having a particle diameter of 50 nm or more and gaps having a maximum width of 50 nm or more, and on the image, the number of magnetic particles that intersect the straight line L is N2, then, the relationship of N1/0.5>60 and N2/0.5>60 is established where N1/0.5 is the number of magnetic particles per micrometer obtained by dividing N1 by 0.5 μm and N2/0.5 is the number of magnetic particles per micrometer obtained by dividing N2 by 0.5 μm.

Here, N1 and N2 each indicate the number of magnetic particles associated with magnetic recording in a region in which neither particles that have a particle diameter of 50 nm or more and are not associated with magnetic recording, such as additives, nor gaps that have a maximum width of 50 nm or more and are not associated with magnetic recording are present, that is, in a region in which mainly magnetic particles are present. Also, N1/0.5 and N2/0.5 are used as the numbers of magnetic particles per micrometer in order to obtain the number of magnetic particles per micrometer by respectively dividing N1 and N2 by lengths of the straight lines W and L of 500 nm (0.5 μm).

By setting N1/0.5 to be greater than 60 and N2/0.5 to be greater than 60, it is possible to ensure a sufficient number of minute magnetic particles and a uniform distribution state of magnetic particles in the width direction and the longitudinal direction of the magnetic layer. Accordingly, even though the length of magnetization (track width) in the width direction of the magnetic layer is set to 1 μm or less, the length being a length of magnetization of signals recorded in the magnetic layer, a good electromagnetic conversion property (SN property) can be obtained. Also, it is more preferable to set N1/0.5 to be greater than 70 and N2/0.5 to be greater than 70.

That is, conventionally, in a storage drive of a magnetic recording medium (for example, magnetic tape), the track width has been 10 times longer than the recording bit length (½ recording wavelength), and in order to increase the recording density, it is necessary to reduce the track width, and in this case, the track width is 1 μm or less, which is below 10 times the recording bit length. If the track width is reduced in this manner, minute magnetic field disturbances become noise, and thus, in order to keep a good SN property, it is necessary to distribute a sufficient number of minute magnetic particles uniformly in the width direction and the longitudinal direction of the magnetic layer. In the present embodiment, by setting N1/0.5 to be greater than 60 and N2/0.5 to be greater than 60, it is possible to achieve a state in which a sufficient number of minute magnetic particles are uniformly distributed in the width direction and longitudinal direction of the magnetic layer.

Also, by setting a relationship between the residual magnetic flux density Mr in the thickness direction of the magnetic layer and the average thickness t of the magnetic layer to be $0.0013$ μT·m$<$Mr·t$<0.0032$ μT·m, and a squareness ratio in the thickness direction of the magnetic layer to be 0.65 or more, the resolution of recording magnetization increases, and thus even though the track width is set to 1 μm or less, a more preferable electromagnetic conversion property (SN property) can be obtained. Furthermore, it is more preferable that $0.0020$ μT·m$<$Mr·t$<0.0030$ μT·m is satisfied, and the squareness ratio is more preferably 0.75 or more.

If a length of magnetization in the width direction of the magnetic layer is set to 1 μm or less, the length being a length of magnetization of a signal recorded in the magnetic layer, reproduction is preferably performed by a tunnel magnetoresistance effect head (TMR head). Even though the length of the magnetization is 1 μm or less in order to increase the track density of the magnetic layer, a high SN ratio can be obtained by reproducing the magnetic recording medium using a highly sensitive TMR head.

The length of the magnetization can be measured as follows, for example. That is, the length of the magnetization in the width direction of the magnetic layer on which signals are recorded is measured using a frequency detection method and "Nano Scope III" (product name) manufactured by Digital Instruments Corporation as the magnetic force microscope. A probe having a cobalt alloy coating (the radius of curvature of the tip: 25 to 40 nm, magnetic coercive force: about 400 [Oe], magnetic moment: about $1 \times 10^{-13}$ emu) is used as the measurement probe, the scanning range is 5 μm×5 μm, and the scanning speed is 5 μm/sec.

Furthermore, the above-described magnetic particles are preferably made of ε-iron oxide. If the track width is 1 μm or less, even though the average particle diameter of magnetic particles is 20 nm or less, the magnetic coercive force of the magnetic particles does not decrease due to usage of ε-iron oxide particles as the magnetic particles.

Also, in order to further support short wavelength recording, the average particle diameter of the magnetic particles made of ε-iron oxide above is preferably 15 nm or less. Furthermore, an average particle diameter of the magnetic particles made of ε-iron oxide above is more preferably 12 nm or less. In general, the lower limit of the average particle diameter of the magnetic particles made of ε-iron oxide above is about 8 nm. This is because ε-iron oxide having an average particle diameter of less than 8 nm is not easily manufactured.

A magnetic coercive force in the thickness direction of the magnetic layer is preferably 3000 oersteds [Oe] or more. This is because by setting the magnetic coercive force to 3000 oersteds [Oe] or more, a high reproduction output with low self demagnetization loss can be obtained even in a short wavelength recording region at a high recording density.

Also, when spacing on the surface of the magnetic layer is measured using a TSA (tape spacing analyzer) after the surface of the magnetic layer is cleaned using n-hexane, a value of the spacing is preferably 5 nm or more and 12 nm or less. If the value of the spacing is lower than 5 nm, the surface of the magnetic layer tends to become excessively smooth, the area of contact between the magnetic head and the magnetic layer tends to increase, a friction coefficient tends to increase, and the durability of the magnetic layer tends to decrease. On the other hand, if the value of the spacing exceeds 12 nm, the distance between the magnetic head and the surface of the magnetic layer tends to increase excessively, and the recording reproduction property tends to decrease. The value of the spacing is more preferably 7 nm or more and 12 nm or less, and most preferably 8 nm or more and 11 nm or less.

Although there is no particular limitation on a method for measuring the value of the spacing and a method for controlling the same, measurement and controlling can be performed using a method disclosed in JP 2012-43495A, for example.

The thickness of the magnetic layer is preferably 30 nm or more and 200 nm or less. By setting the thickness of the magnetic layer to 200 nm or less, the short wavelength recording property can be improved, and by setting the thickness of the magnetic layer to 30 nm or more, a servo signal can be recorded. If ε-iron oxide particles are used as the magnetic particles of the present embodiment, the saturation magnetization quantity of the ε-iron oxide particles is ½ to ⅓ smaller than the saturation magnetization quantity of conventional ferromagnetic hexagonal ferrite particles, and thus, if a servo signal having a long recording wavelength is recorded, the thickness of the magnetic layer needs to be 30 nm or more.

If the servo signal is not recorded in the magnetic layer, the thickness of the magnetic layer is preferably 10 nm or more and 50 nm or less. Even though the thickness of the magnetic layer is 10 nm or more and 50 nm or less, a data signal can be recorded and reproduced using a highly sensitive magnetic head such as a tunnel magnetoresistance effect head (TMR head).

Hereinafter, the magnetic recording medium of the present embodiment will be described based on the drawings. FIG. 1 is a schematic cross-sectional diagram showing one example of the magnetic recording medium of the present embodiment.

In FIG. 1, a magnetic recording medium 10 of the present embodiment is a magnetic tape including a nonmagnetic support body 11, an undercoat layer 12 formed on one main surface (upper surface herein) of the nonmagnetic support body 11, and a magnetic layer 13 formed on a main surface (upper surface herein) of the undercoat layer 12 that is opposite to the nonmagnetic support body 11 side. Also, the main surface (lower surface) of the nonmagnetic support body 11 on which the undercoat layer 12 is not formed is provided with a back coat layer 14.

Magnetic Layer

The magnetic layer 13 contains magnetic particles and a binder. ε-iron oxide particles are preferable as the magnetic particles.

It is preferable that the above-described ε-iron oxide particles are formed by a single phase expressed by a general composition formula ε-$Fe_2O_3$. This is because if α-iron oxide or γ-iron oxide is mixed in, the magnetic coercive force of the magnetic layer decreases. However, α-iron oxide or γ-iron oxide may be included as impurities as long as the magnetic coercive force of the magnetic layer does not decrease.

Also, in the present embodiment, ε-iron oxide and other types of iron oxide such as γ-iron oxide and α-iron oxide can be identified by analyzing their crystal structures through X-ray diffraction.

The magnetic coercive force of the ε-iron oxide particles is preferably 3000 oersteds [Oe] or more. Accordingly, the magnetic coercive force in the thickness direction of the magnetic layer can be set to 3000 oersteds [Oe] or more. Also, if particles made of ε-iron oxide expressed by a general composition formula ε-$Fe_2O_3$ contain impurities, the magnetic coercive force of ε-iron oxide particles decreases, and thus it is preferable that the ε-iron oxide particles do not contain impurities. However, the magnetic coercive force of the above-described ε-iron oxide particles can be controlled by substituting a part of Fe sites of the crystals with trivalent metal elements such as aluminum (Al), gallium (Ga), rhodium (Rh), and indium (In). Thus, the ε-iron oxide particles may contain metal elements other than iron as impurities as long as the magnetic coercive force can be kept at 3000 oersteds [Oe] or more.

As described above, the average particle diameter of the ε-iron oxide particles included in the magnetic layer is preferably set to 8 nm or more and 15 nm or less. If the average particle diameter of the ε-iron oxide particles exceeds 15 nm, in particular, noise of the magnetic recording medium increases in short wavelength recording, and thus a high electromagnetic conversion property tends not to be obtained.

In the present embodiment, the average particle diameter of magnetic particles included in the magnetic layer was determined as follows using 100 magnetic particles in one field of view using a photograph obtained by imaging the surface of the magnetic layer with an acceleration voltage of 2 kV, 10000-fold (10 k-fold) magnification, and an observation condition of U-LA100, using a scanning electron microscope (SEM) "S-4800" manufactured by HITACHI Ltd.

If the particles have a needle shape, the average particle diameter is determined by calculating an average long axial diameter of 100 particles, if the particles have a plate shape, the average particle diameter is determined by calculating an average maximum plate diameter of 100 particles, and if the particles are spherical or an ellipsoidal shape in which a ratio of the longer axis length to the shorter axis length is 1 to 3.5, the average particle diameter is determined by calculating an average maximum diameter of 100 particles.

A conventionally known thermoplastic resin, thermosetting resin, or the like can be used as the binder included in the magnetic layer 13. Specifically, examples of the above-described thermoplastic resin include a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, and a polyester polyurethane resin. Also, specific examples of the above-described thermosetting resin include a phenolic resin, an epoxy resin, a polyurethane resin, a urea resin, a melamine resin, and an alkyd resin.

The content of the binder in the magnetic layer 13 is preferably 7 to 50 parts by mass and more preferably 10 to 35 parts by mass with respect to 100 parts by mass of magnetic particles.

Also, it is preferable to use a thermosetting crosslinking agent that binds to functional groups or the like included in the binder and forms a crosslinking structure in combination with the binder. Specific examples of the above-described crosslinking agent include isocyanate compounds such as tolylene diisocyanate, hexamethylene diisocyanate, and isophorone diisocyanate; reaction products of an isocyanate compound and a compound having a plurality of hydroxyl groups such as trimethylolpropane; and various polyisocyanates such as products obtained by condensation of isocyanate compounds. The content of the above-described crosslinking agent is preferably 10 to 50 parts by mass with respect to 100 parts by mass of the binder.

If the magnetic layer 13 contains the above-described magnetic particles and binder, the magnetic layer 13 may further contain an additive such as a polishing agent, a lubricant, or a dispersing agent. In particular, from the viewpoint of durability, a polishing agent and a lubricant are preferably used.

Specific examples of the above-described polishing agent include α-alumina, β-alumina, silicon carbide, chromium oxide, cerium oxide, α-iron oxide, corundum, artificial diamond, silicon nitride, silicon carbide, titanium carbide, titanium oxide, silicon dioxide, and boron nitride, and among these, a polishing agent having a Mohs' hardness of 6 or more is more preferable. These may be used alone or in combination. The average particle diameter of the above-described polishing agent is preferably 10 to 200 nm although it depends on the type of polishing agent that is to be used. The content of the above-described polishing agent is preferably 5 to 20 parts by mass and more preferably 8 to 18 parts by mass with respect to 100 parts by mass of magnetic particles.

Examples of the above-described lubricant include fatty acids, fatty acid esters, and fatty acid amides. Although the above-described fatty acid may be any of linear, branched, and cis/trans isomers, a linear fatty acid having excellent lubricant performance is preferable. Specific examples of such fatty acids include lauric acid, myristic acid, stearic acid, palmitic acid, behenic acid, oleic acid, and linoleic acid. Specific examples of the above-described fatty acid ester include N-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the above-described fatty acid amide include palmitic acid amide and stearic acid amide. These lubricants may be used alone or in combination.

Among these, it is preferable to use a fatty acid ester and a fatty acid amide in combination. In particular, it is preferable to use 0.2 to 3 parts by mass of a fatty acid ester and 0.5 to 5 parts by mass of a fatty acid amide with respect to 100 parts by mass of the total solid content such as magnetic particles and polishing agents in the magnetic layer 13. This is because if the content of the above-described fatty acid ester is less than 0.2 parts by mass, the fatty acid ester has a small friction coefficient reduction effect, and if the content thereof exceeds 3.0 parts by mass, there is a concern about the occurrence of side effects such as the magnetic layer 13 attaching to the head. Also, this is because if the content of the above-described fatty acid amide is less than 0.5 parts by mass, the fatty acid amide has little effect of preventing seizing caused by mutual contact between the magnetic head and the magnetic layer 13, and if the content thereof exceeds 5 parts by mass, there is a concern that the fatty acid amide will undergo bleedout.

Also, the magnetic layer 13 may contain carbon black for the purpose of increasing the conductivity and surface lubricity. Specific examples of such carbon black include acetylene black, furnace black, and thermal black. The average particle diameter of carbon black is preferably 0.01 to 0.1 µm. If the above-described average particle diameter is 0.01 µm or more, it is possible to form the magnetic layer 13 in which carbon black is well dispersed. On the other hand, if the above-described average particle diameter is 0.1 µm or less, it is possible to form the magnetic layer 13 having excellent surface smoothness. Also, two or more types of carbon black having different average particle diameters may be used as needed. The content of the above-described carbon black is preferably 0.2 to 5 parts by mass and more preferably 0.5 to 4 parts by mass with respect to 100 parts by mass of magnetic particles.

It is preferable that a center-line average surface roughness Ra of the magnetic layer 13 is less than 2.0 nm, the center-line average surface roughness being defined in Japanese Industrial Standard (JIS) B0601. The more the surface smoothness of the magnetic layer 13 increases, the higher the output can be obtained, but if the surface of the magnetic layer 13 is excessively smoothened, the friction coefficient becomes high and the travel stability decreases. Thus, Ra is preferably 1.0 nm or more.

Figure 2:
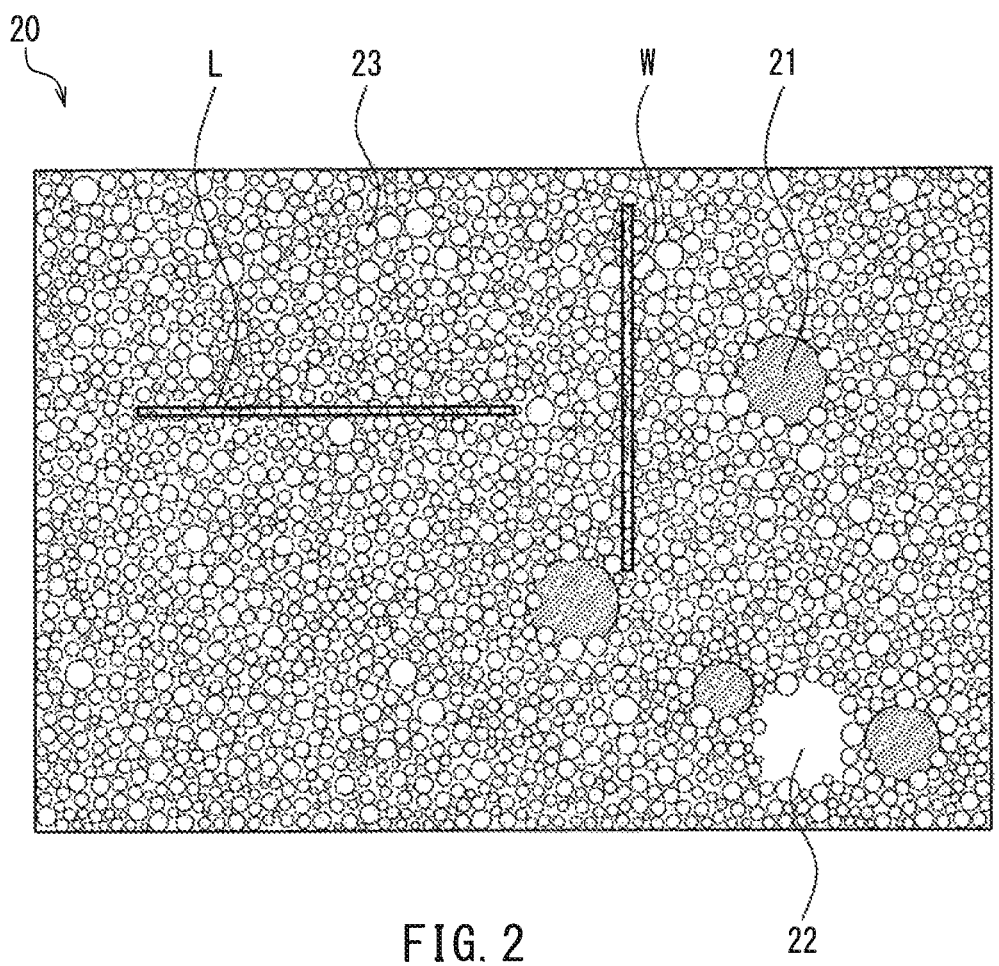
FIG. 2 is an illustrative diagram showing an image obtained by observing a surface of a magnetic layer using a scanning electron microscope.

Next, the surface state of the magnetic layer 13 will be described. FIG. 2 is a schematic diagram showing an image obtained by observing the surface of the magnetic layer 13 in FIG. 1 using a scanning electron microscope.

In FIG. 2, a straight line W having a length of 500 nm and a width of 15 nm is displayed parallel to the width direction of the magnetic layer 13 and a straight line L having a length of 500 nm and a width of 15 nm is displayed parallel to the longitudinal direction of the magnetic layer 13, on an image 20 obtained by observing the surface of the magnetic layer 13 in FIG. 1 using the scanning electron microscope at 10 k-fold magnification. Here, if the straight line W does not intersect particles 21 having a particle diameter of 50 nm or more and gaps 22 having a maximum width of 50 nm or more on the image 20, and on the image 20, the number of magnetic particles 23 intersecting the straight line W is N1, and the straight line L does not intersect particles 21 having a particle diameter of 50 nm or more and gaps 22 having a maximum width of 50 nm or more on the image 20, and on the image 20, the number of magnetic particles 23 intersecting the straight line L is N2, then, a relationship in which N1/0.5 is greater than 60 (N1/0.5>60) and N2/0.5 is greater than 60 (N2/0.5>60) is established where N1/0.5 is the number of magnetic particles per micrometer obtained by dividing N1 by 0.5 µm and N2/0.5 is the number of magnetic particles per micrometer obtained by dividing N2 by 0.5. Accordingly, it is possible to ensure, in the width direction and the longitudinal direction of the magnetic layer 13, a sufficient number of minute magnetic particles, obtain a state in which magnetic particles are uniformly distributed, and a good electromagnetic conversion property (SN property) even if the track width is 1 µm or less. Here, intersecting means that all or part of the magnetic particles are included in the straight line W or the straight line L.

A specific method for establishing the relationship of N1/0.5>60 and N2/0.5>60 in the magnetic layer 13 will be described in detail in the description of a method for manufacturing the magnetic recording medium of the present embodiment, which will be described later.

Lubricant Layer

Although not shown in FIG. 1, in order to reduce the friction coefficient of the magnetic layer 13 and further increase the durability of the magnetic layer 13, it is preferable to provide, on the magnetic layer 13, a lubricant layer containing a fluorine-based lubricant or a silicone-based lubricant. Examples of the above-described fluorine-based lubricant include trichlorofluoroethylene, perfluoropolyether, perfluoroalkyl polyether, and perfluoroalkyl carboxylic acid. Examples of the above-described silicone-based lubricant include silicone oil and modified silicone oil. These lubricants may be used alone or in combination. More specifically, for example, "NOVEC7100" or "NOVEC1720" (product name) manufactured by 3M Company can be used as the fluorine-based lubricant, and "KF-96L", "KF-96A", "KF-96", "KF-96H" "KF-99", "KF-50", "KF-54", "KF-965", "KF-968", "HIVAC F-4", "HIVAC F-5", "KF-56A", "KF995", "KF-69", "KF-410", "KF-412", "KF-414", and "FL" (product name) manufactured by Shin-Etsu Chemical Co., Ltd., and "BY16-846", "SF8416", "SH200", "SH203", "SH230", "SF8419", "FS1265", "SH510", "SH550", "SH710", "FZ-2110", and "FZ-2203" (product name) manufactured by Dow Corning Toray Co., Ltd. can be used as the silicone-based lubricant.

There is no particular limitation on the thickness of the lubricant layer, and it is sufficient that the thickness thereof is 3 to 5 nm, for example. The thickness of the lubricant layer can be measured using a method in which a TSA disclosed in JP 2012-43495A above is used, based on a difference in spacing between the magnetic recording medium and a transparent body before and after the lubricant layer is cleaned using an organic solvent.

The lubricant layer can be formed by top-coating the magnetic layer 13 with the lubricant. As described above, the magnetic layer 13 is uniformly filled with minute magnetic particles, and thus the lubricants included in the magnetic layer 13 are unlikely to move to the surface of the magnetic layer 13. However, by top-coating in which the lubricants are applied to the surface of the magnetic layer, a lubricant layer can be reliably formed on the surface of the magnetic layer 13.

Undercoat Layer

An undercoat layer 12 having a lubricant retention function and an external stress (e.g., pressing force of the magnetic head) cushioning function is preferably provided under the magnetic layer 13. Also, by providing the undercoat layer 12, the strength of the magnetic recording medium 10 increases, and thus when the magnetic recording medium 10 is formed, calendering can be performed and the fillability of the magnetic layer 13 can be improved. The undercoat layer 12 contains nonmagnetic powder, a binder, and a lubricant.

Examples of the nonmagnetic powder included in the undercoat layer 12 include carbon black, titanium oxide, iron oxide, and aluminum oxide, and in general, carbon black is used alone, or carbon black and another nonmagnetic powder such as titanium oxide, iron oxide, or aluminum oxide are mixed and used. In order to form a smooth undercoat layer 12 by forming a coating film with little thickness unevenness, it is preferable to use nonmagnetic powder having a sharp particle size distribution. From the viewpoint of ensuring the uniformity, surface smoothness, rigidity, and conductivity of the undercoat layer 12, an average particle diameter of the above-described nonmagnetic powder is preferably 10 to 1000 nm and more preferably 10 to 500 nm, for example.

The particle shape of the nonmagnetic powder included in the undercoat layer 12 may be any of a spherical shape, a plate shape, a needle shape, and a spindle shape. An average long axial diameter of a needle-shaped or spindle nonmagnetic powder is preferably 10 to 300 nm and an average short axial diameter thereof is preferably 5 to 200 nm. An average particle diameter of a spherical nonmagnetic powder is preferably 5 to 200 nm and more preferably 5 to 100 nm. An average particle diameter of a plate-shaped nonmagnetic powder is preferably 10 to 200 nm in terms of the maximum plate diameter. Furthermore, in order to form the smooth undercoat layer 12 having little thickness unevenness, nonmagnetic powder having a sharp particle size distribution is preferably used.

A binder and a lubricant that are similar to those used in the above-described magnetic layer 13 are used as the binder and the lubricant that are included in the undercoat layer 12. The content of the above-described binder is preferably 7 to 50 parts by mass and more preferably 10 to 35 parts by mass with respect to 100 parts by mass of the above-described nonmagnetic powder. Also, the content of the above-described lubricant is preferably 2 to 6 parts by mass and more preferably 2.5 to 4 parts by mass with respect to 100 parts by mass of the above-described nonmagnetic powder.

If the magnetic particles used in the magnetic layer 13 are ε-iron oxide particles, the saturation magnetization quantity of the ε-iron oxide particles is ½ to ⅓ smaller than the saturation magnetization quantity of conventional ferromagnetic hexagonal ferrite particles, and thus, if a servo signal having a long recording wavelength is recorded, the undercoat layer 12 needs to contain magnetic particles. For example, needle-shaped metal iron-based magnetic particles, plate-shaped hexagonal ferrite magnetic particles, particulate iron nitride-based magnetic particles, or the like can be used as the above-described magnetic particles.

The thickness of the undercoat layer 12 is preferably 0.1 to 3 μm and more preferably 0.3 to 2 μm. By setting the thickness of the undercoat layer 12 in this range, a lubricant retention function and an external stress cushioning function can be maintained without unnecessarily increasing the total thickness of the magnetic recording medium 10.

Nonmagnetic Support Body

A nonmagnetic support body for a magnetic recording medium that has been used conventionally can be used as the nonmagnetic support body 11. Specific examples thereof include films made of polyesters such as polyethylene terephthalate and polyethylene naphthalate, and films made of polyolefins, cellulose triacetate, polycarbonate, polyamide, polyimide, polyamide-imide, polysulfone, or aramid.

The thickness of the nonmagnetic support body 11 varies depending on the applications, and is preferably 1.5 to 11 μm and more preferably 2 to 7 μm. If the thickness of the nonmagnetic support body 11 is 1.5 μm or more, the film formation property increases and a high strength can be obtained. On the other hand, if the thickness of the nonmagnetic support body 11 is 11 μm or less, the total thickness does not necessarily increase, and the storage capacity per reel of a magnetic tape can be increased, for example.

A Young's modulus in the longitudinal direction of the nonmagnetic support body 11 is preferably 5.8 GPa or more and more preferably 7.1 GPa or more. If the Young's modulus in the longitudinal direction of the nonmagnetic support body 11 is 5.8 GPa or more, the travel ability can be increased. Also, in a magnetic recording medium used in a helical scan system, a ratio (MD/TD) between the Young's modulus in the longitudinal direction (MD) and the Young's modulus in the width direction (TD) is preferably 0.6 to 0.8, more preferably 0.65 to 0.75, and even more preferably 0.7. If the ratio (MD/TD) is in the above-described range, it is possible to suppress variation (flatness) in the output from the entry side on which a magnetic head enters a track to the exit side on which the magnetic head exits the track. In a magnetic recording medium used in a linear recording system, a ratio (MD/TD) between the Young's modulus in the longitudinal direction (MD) and the Young's modulus (TD) in the width direction is preferably 0.7 to 1.3.

Back Coat Layer

A main surface (lower surface herein) that is opposite to the main surface of the nonmagnetic support body 11 that is provided with the undercoat layer 12 is preferably provided with a back coat layer 14 for the purpose of increasing the travel ability or the like. The thickness of the back coat layer 14 is preferably 0.2 to 0.8 μm and more preferably 0.3 to 0.8 μm. If the thickness of the back coat layer 14 is excessively thin, the back coat layer 14 has an insufficient travel ability increasing effect, and if the thickness thereof is excessively thick, the total thickness of the magnetic recording medium 10 increases, and the storage capacity per reel of a magnetic tape decreases, for example.

The back coat layer 14 preferably contains carbon black such as acetylene black, furnace black, or thermal black, for example. In general, carbon black with a smaller particle diameter and carbon black with a larger particle diameter whose particle diameters are different from each other are used in combination. The reason why these are used in combination is that the travel ability increasing effect increases.

Also, the back coat layer 14 contains a binder, and a binder that is similar to that used in the magnetic layer 13 and the undercoat layer 12 can be used as the binder. Among these, in order to reduce the friction coefficient and increase the travel ability of the magnetic head, it is preferable to use a cellulose-based resin and a polyurethane resin in combination.

For the purpose of increasing the strength, the back coat layer 14 preferably further contains iron oxide, alumina, and the like.

Next, a method for manufacturing a magnetic recording medium of the present invention will be described. In the method for manufacturing the magnetic recording medium of the present invention, for example, a magnetic layer formation coating material, an undercoat layer formation coating material, and a back coat layer formation coating material are produced by mixing layer formation components and solvents, and a magnetic layer is formed using a sequential multilayer coating method in which the undercoat layer is formed by applying the undercoat layer formation coating material to one side of a nonmagnetic support body and dried, and then the magnetic layer formation coating material is applied to the undercoat layer and dried, and the back coat layer is further formed by applying the back coat layer formation coating material to the other side of the nonmagnetic support body and drying the back coat layer formation coating material. Thereafter, calendering is performed on the entireties of the layers so as to obtain a magnetic recording medium.

Also, instead of the above-described sequential multilayer coating method, it is also possible to adopt a simultaneous multilayer coating method in which the magnetic layer formation coating material is applied to the undercoat layer formation coating material and dried after the undercoat layer formation coating material is applied to the one side of the nonmagnetic support body and before the undercoat layer formation coating material is dried.

There is no particular limitation on the method for applying the above-described coating materials, and gravure coating, roll coating, blade coating, extrusion coating, or the like can be used, for example.

The following methods are examples of the method for establishing the relationship of $N1/0.5>60$ and $N2/0.5>60$ in the above-described magnetic layer, and the following methods can be implemented alone, or a plurality of the following methods can be implemented in combination.

(1) There is a method in which aggregation of the magnetic powder is reduced by connecting a continuous kneading apparatus in series behind a batch kneading apparatus, and then kneading and dispersing the magnetic powder. For example, the magnetic powder is first kneaded using the batch kneading apparatus with a solid concentration of 70 to 90 mass %, and a kneaded material is removed by adding a solvent after kneading to dilute the solid concentration to 50 to 69 mass %, whereafter the kneaded material obtained by performing kneading using the continuous kneading apparatus with a solid concentration of 25 to 50 mass % is dispersed using a sand mill. With this method, after the end of kneading, the solid concentration when the kneaded material is removed can be kept high, and thus aggregation of the magnetic powder can be suppressed in a dilution process in which a solvent is added after kneading using a high shear force, and a magnetic layer having a high magnetic powder density can be obtained.

(2) In the method in which the kneaded material is dispersed using a sand mill after being kneaded using the batch kneading apparatus, there is a method in which aggregation of the magnetic powder is reduced by performing a pressure preliminary dispersion treatment process before kneading. For example, a preparation treatment process is performed which includes a liquid mixture preparation process for preparing a liquid mixture that contains the magnetic powder, a binder, and an organic solvent and has a solid concentration of 15 mass % or less, a pressure preliminary dispersion treatment process for spraying the obtained liquid mixture from a nozzle in a pressed state using a high-pressure spray collision dispersion device, a concentration process for concentrating the obtained preliminary dispersion liquid, a kneading process for kneading the obtained concentrate and the binder in a state in which the solid concentration is 80 mass % or more, a dilution process for diluting the obtained kneaded material using a dilution component, and a dispersion treatment process for dispersing the obtained pre-dispersion slurry having a solid concentration of 10 to 50 mass % using a dispersion medium.

It is preferable that in the above-described kneading process, the preliminary dispersion liquid is concentrated such that the solid concentration is 80 mass % or more, and the share at the time of kneading is 70 N·m or more.

Also, examples of the high-pressure spray collision dispersion device used in the pressure preliminary dispersion treatment process include a dispersion device having a chamber that discharges the above-described liquid mixture from a small nozzle by applying pressure to the liquid mixture using a high-pressure flange pump, and a dispersion device having a chamber that sprays the liquid mixture from a plurality of opposed nozzles so as to cause the mixture to undergo face-to-face collision. Specific examples include "ALTIMIZER" (product name) manufactured by Sugino Machine Limited, a homogenizer, and a nanomizer. The pressure applied to spray the liquid mixture is preferably 50 MPa or more and more preferably 100 MPa or more. Treatments are preferably performed two times or more with consideration given to a viscosity difference before and after dispersion, the particle size distribution of objects that are dispersed, prevention of a short pass of the liquid mixture, and the like. A dispersion device provided with a disk (including perforations, incisions, grooves, and the like), a pin, and a ring on a stirring shaft, and a rotor rotary dispersion device (for example, nano mill, pico mill, sand mill, dyno mill, and the like), and the like can be used as a medium dispersion device used in the dispersion treatment process. Although the dispersion time depends on the components of the magnetic coating material and the applications, it is preferably 30 to 90 minutes in terms of the retention time.

(3) There is a method in which aggregation of the magnetic powder is reduced by applying a high shear force to the magnetic powder using a continuous kneading apparatus, kneading the magnetic powder, and then kneading the magnetic powder with an appropriate shear force for a long period of time using a batch kneading apparatus. For example, a magnetic layer can be manufactured through a kneading process for kneading magnetic powder and a binder resin with a first solid concentration using a continuous kneading apparatus, and pulverizing the magnetic powder as much as possible by applying a high shear force to the magnetic powder so as to obtain magnetic kneaded material, and a re-kneading process for kneading the kneaded magnetic material with a second solid concentration that is less than or equal to the first solid concentration using a batch kneading apparatus that is arranged in series with the continuous kneading apparatus, applying a shear force to a surface of the pulverized magnetic powder, and covering the pulverized magnetic powder with a binder resin, which is the binder, by causing the magnetic powder to adsorb the binder resin as much as possible in a state in which the binder resin is extended. At this time, it is preferable to set the first solid concentration in a range of 80 to 90 mass %, the second solid concentration in a range of 65 to 90 mass %, and the kneading time in a range of 30 to 240 minutes.

Use of this method makes it possible to knead magnetic powder with a high shear force applied using the above-described continuous kneading apparatus, and to knead a magnetic kneaded material well while taking time using the above-described batch kneading apparatus, and thus magnetic powder sufficiently adsorbs the binder resin, the degree of dispersion of constituents such as magnetic powder for the magnetic coating material increases in the dispersion process, and a magnetic layer having a high magnetic powder density can be obtained.

(4) The dispersion time in the sand mill can be shortened by increasing the degree of dispersion in the kneading process using the above-described methods (1) to (3), and thus the occurrence of contamination caused by mixing of bead abrasion powder can be reduced and a magnetic layer having a high magnetic powder density can be obtained.

Also, using sand mill dispersion and a centrifugation process using a centrifuge after the dilution process makes it possible to remove magnetic powder having a predetermined particle size or more, and thus aggregates and undispersed substances are removed and a uniform magnetic coating material can be obtained. It is preferable to perform the centrifugation process at an acceleration of 1000 to 20000 G.

Also, a magnetic coating material having a more stable dispersiveness can be obtained by including the re-dispersion process in which the magnetic powder is further dispersed using a collision dispersion device, after the above-described dispersion process. A collision dispersion device that can be used at a high pressure of 50 to 250 MPa is preferable.

(5) There is a method in which a fine magnetic layer is obtained by slowly drying in the application/drying process. In particular, if thin magnetic layers are applied and dried through sequential multilayer coating, the solvent dries due to the magnetic layers quickly drying, and thereby the magnetic layer tends to be coarse. In view of this, by increasing the solvent concentration of air in a dry area so as to slow the drying speed and slowly drying the magnetic layers, a magnetic layer having a high magnetic powder density can be obtained.

Specifically, in the magnetic layer application/drying process, it is preferable to perform a preheating process for heating a magnetic coating film until an increase in the surface temperature of the magnetic coating film stops and the temperature reaches an approximately constant, temperature, a constant-rate drying process that is performed after the preheating process and in which the surface temperature of the magnetic coating film is kept approximately constant, and a reduced-rate drying process that is performed after the constant-rate drying process and in which the surface temperature of the magnetic coating film becomes higher than the temperature at which the constant-rate drying process is performed so as to solidify the magnetic coating film, and it is preferable to set the constant-rate drying period to 0.2 seconds or more.

(6) As a method other than the above-described methods, by applying a magnetic coating material with a high solid concentration S/S, the amount of a solvent that evaporates during drying is reduced, and a finer magnetic layer can be formed.

Hereinafter, although the present invention will be described using working examples, the present invention is not merely limited to the following working examples. Also, "parts" refers to "parts by mass" in the description below.

Working Example 1

Preparation of Magnetic Coating Material

A mixture was prepared by mixing magnetic coating material components (1) shown in Table 1 at a high speed using a high-speed stirring mixer. Next, after the obtained mixture was subjected to dispersion treatment using a sand mill for 250 minutes, magnetic coating material components (2) shown in Table 2 were added so as to prepare a dispersion liquid. Next, the obtained dispersion liquid and magnetic coating material components (3) shown in Table 3 were stirred using a disperser, and filtered using a filter so as to prepare a magnetic coating material. The solid concentration S/S of the above-described magnetic coating material was 23 mass %.

TABLE 1

| Magnetic coating material components (1) | parts |
|---|---|
| $\varepsilon$-$Fe_2O_3$ magnetic powder, average particle diameter: 14 nm | 100 |
| Vinyl chloride-based copolymer (containing $SO_3K$ group), "MR104" manufactured by Zeon Corporation | 13.5 |
| Polyurethane resin (containing $SO_3Na$ group, glass transition temperature: 70° C.) "UR8200" manufactured by TOYOBO CO., LTD. | 8 |
| Carbon black (average particle diameter: 75 nm) | 2 |
| Particulate alumina powder (average particle diameter: 80 nm) | 8 |
| Cyclohexanone | 120 |
| Toluene | 120 |

TABLE 2

| Magnetic coating material components (2) | parts |
|---|---|
| n-butyl stearate | 1 |
| Cyclohexanone | 65 |
| Methyl ethyl ketone | 65 |
| Toluene | 65 |

TABLE 3

| Magnetic coating material components (3) | parts |
|---|---|
| Polyisocyanate | 3.5 |
| Cyclohexanone | 7 |
| Toluene | 7 |

Preparation of Undercoating Material

A kneaded material was prepared by kneading undercoating material components (1) shown in Table 4 using a batch kneader. Next, the obtained kneaded material and undercoating material components (2) shown in Table 5 were stirred using a disperser so as to prepare a liquid mixture. Next, a dispersion liquid was prepared by dispersing the obtained liquid mixture using a sand mill for 100 minutes, and then the dispersion liquid and undercoating material components (3) shown in Table 6 were stirred using a disperser and filtered using a filter so as to prepare an undercoating material.

TABLE 4

| Undercoating material components (1) | parts |
|---|---|
| Needle-shaped iron oxide (average longer axis length: 110 nm) | 79 |
| Carbon black (average particle diameter: 17 nm) | 18 |
| Particulate alumina powder (average particle diameter: 140 nm) | 3 |
| Vinyl chloride-hydroxypropyl acrylate copolymer (containing SO$_3$Na group) | 9 |
| Polyurethane resin (containing SO$_3$Na group, glass transition temperature: 20° C.) "UR8300" manufactured by TOYOBO CO., LTD. | 7.5 |
| Cyclohexanone | 120 |
| Methyl ethyl ketone | 60 |
| Toluene | 60 |

TABLE 5

| Undercoating material components (2) | parts |
|---|---|
| Stearic acid | 1 |
| n-butyl stearate | 1.5 |
| Cyclohexanone | 120 |
| Toluene | 120 |

TABLE 6

| Undercoating material components (3) | parts |
|---|---|
| Polyisocyanate | 4.5 |
| Cyclohexanone | 7 |
| Toluene | 7 |

Preparation of Coating Material for Back Coat Layer

A liquid mixture obtained by mixing coating material components for a back coat layer shown in Table 7 was dispersed using a sand mill for 50 minutes so as to prepare a dispersion liquid. 15 parts of polyisocyanate were added to the obtained dispersion liquid, stirred, and filtered using a filter so as to prepare a coating material for a back coat layer.

TABLE 7

| Coating material components for back coat layer | parts |
|---|---|
| Carbon black (average particle diameter: 25 nm) | 80 |
| Carbon black (average particle diameter: 300 nm) | 10 |
| α-hematite powder (average particle diameter: 100 nm) | 10 |
| Nitrocellulose | 45 |
| Polyurethane resin (containing SO$_3$Na group, glass transition temperature: 20° C.) "UR8300" manufactured by TOYOBO CO., LTD. | 30 |
| Cyclohexanone | 300 |
| Methyl ethyl ketone | 500 |
| Toluene | 500 |

Preparation of Magnetic Tape for Evaluation

An undercoat layer was formed by applying the above-described undercoating material onto a nonmagnetic support body (polyethylene naphthalate film, thickness: 5 μm) such that the thickness of the undercoat layer after calendering was 1.1 μm, and drying the undercoating material at 100° C. Next, a magnetic layer was formed by applying the above-described magnetic coating material onto the above-described undercoat layer using a die coater with a coater tension of 4.5 N/inch such that the thickness of a magnetic layer after calendering was 55 nm, and drying the magnetic coating material at 100° C. Thereafter, vertical alignment treatment was performed while an oriented magnetic field (450 kA/m) was applied using a solenoid magnet.

Next, a back coat layer was formed by applying the above-described coating material for a back coat layer to the undercoat layer of the nonmagnetic support body and a surface that was opposite to the surface provided with the magnetic layer such that the thickness after calendering was 0.5 μm, and drying the coating material at 100° C.

Thereafter, the undercoat layer and the magnetic layer were formed on the upper surface of the nonmagnetic support body, a whole cloth roll provided with the back coat layer on its lower surface was subjected to calendering using a calender apparatus having seven stages of metal rolls at a temperature of 100° C. and a linear pressure of 300 kg/cm.

Lastly, a magnetic sheet was produced by subjecting the obtained whole cloth roll to hardening treatment at 60° C. for 48 hours. A magnetic tape for evaluation was produced by cutting the obtained magnetic sheet into ½-inch width.

Working Example 2

A magnetic tape for evaluation was produced similarly to Working Example 1 except that the magnetic coating material that was produced in Working Example 1 was applied such that the thickness of a magnetic layer after calendering was 135 nm.

Working Example 3

The ε-Fe$_2$O$_3$ magnetic powder in the magnetic coating material components (1) shown in Table 1 was changed to one having an average particle diameter of 12 nm, the changed magnetic coating material components (1) were mixed at a high speed using a high-speed stirring mixer to prepare a mixture. Next, after the obtained mixture was subjected to dispersion treatment using a sand mill for 250 minutes, re-dispersion treatment was further performed using a collision dispersion device. Thereafter, the magnetic coating material components (2) shown in Table 2 were added similarly to Working Example 1 so as to prepare a dispersion liquid. Next, the obtained dispersion liquid and magnetic coating material components (3) shown in Table 3 were stirred using a disperser, and filtered using a filter so as to prepare a magnetic coating material.

A magnetic tape for evaluation was produced similarly to Working Example 1 except that the magnetic coating material was applied such that the thickness of a magnetic layer after calendering was 85 nm.

Working Example 4

A magnetic tape for evaluation was produced similarly to Working Example 1 except that the magnetic coating material that was produced in Working Example 1 was applied such that the thickness of a magnetic layer after calendering was 85 nm and dried at 100° C. to form a magnetic layer, and then the vertical alignment treatment was performed while an oriented magnetic field (900 kA/m) was applied using a solenoid magnet.

Working Example 5

A magnetic coating material was prepared similarly to Working Example 1 except that the ε-Fe$_2$O$_3$ magnetic powder in the magnetic coating material components (1) shown in Table 1 was changed to one having an average particle diameter of 16 nm. A magnetic tape for evaluation was produced similarly to Working Example 1 except that the magnetic coating material was applied such that the thickness of a magnetic layer after calendering was 85 nm.

Working Example 6

A magnetic tape for evaluation was produced similarly to Working Example 1 except that the magnetic coating material that was produced in Working Example 1 was applied such that the thickness of a magnetic layer after calendering was 85 nm and dried at 100° C. to form a magnetic layer, and then the vertical alignment treatment was performed while an oriented magnetic field (300 kA/m) was applied using a solenoid magnet.

Working Example 7

A magnetic tape for evaluation was produced similarly to Working Example 1 except that an undercoat layer and a magnetic layer were formed on the upper surface of a nonmagnetic support body by applying the magnetic coating material that was produced in Working Example 1 such that the thickness of a magnetic layer after calendering was 85 nm, a whole cloth roll provided with a back coat layer on its lower surface was subjected to calendering using a calender apparatus having seven stages of metal rolls at a temperature of 90° C. and a linear pressure of 300 kg/cm.

Comparative Example 1

A magnetic tape for evaluation was produced similarly to Working Example 1 except that the magnetic coating material that was produced in Working Example 1 was applied such that the thickness of a magnetic layer after calendering was 43 nm.

Comparative Example 2

A magnetic tape for evaluation was produced similarly to Working Example 1 except that the magnetic coating material that was produced in Working Example 1 was applied such that the thickness of a magnetic layer after calendering was 150 nm.

Comparative Example 3

A magnetic tape for evaluation was produced similarly to Working Example 1 except that the magnetic coating material that was produced in Working Example 1 was applied such that the thickness of a magnetic layer after calendering was 85 nm and dried at 100° C. to form a magnetic layer, and then the vertical alignment treatment was performed while an oriented magnetic field (100 kA/m) was applied using a solenoid magnet Comparative Example 4

A magnetic coating material was prepared similarly to Working Example 1 except that the ε-Fe$_2$O$_3$ magnetic powder in the magnetic coating material components (1) shown in Table 1 was changed to one having an average particle diameter of 18 nm. A magnetic tape for evaluation was produced similarly to Working Example 1 except that the magnetic coating material was applied such that the thickness of a magnetic layer after calendering was 85 nm.

Comparative Example 5

A magnetic tape for evaluation was produced similarly to Working Example 1 except that the magnetic coating material was applied with the amounts of cyclohexanone, methyl ethyl ketone, and toluene, which were the solvent components in the magnetic coating material components (2) shown in Table 2, being changed to 100 parts each, the solid concentration S/S of the magnetic coating material being 20 mass %, and the die coater having a coater tension of 2.5 N/inch.

Comparative Example 6

A magnetic coating material was prepared similarly to Working Example 1 except that the ε-Fe$_2$O$_3$ magnetic powder in the magnetic coating material components (1) shown in Table 1 was changed to one having an average particle diameter of 12 nm, the amounts of cyclohexanone, methyl ethyl ketone, and toluene, which were the solvent components in the magnetic coating material components (2) shown in Table 2, were changed to 100 parts each, and the solid concentration S/S of the magnetic coating material was 20 mass %. A magnetic tape for evaluation was produced similarly to Working Example 1 except that the magnetic coating material was applied with the die coater having a coater tension of 2.5 N/in such that the thickness of a magnetic layer after calendering was 85 nm. Note that in Comparative Example 6, the average particle diameter of the ε-Fe$_2$O$_3$ magnetic powder was reduced to 12 nm similarly to Working Example 3, but unlike Working Example 3, re-dispersion treatment using a collision dispersion device was not performed.

Next, the following properties were measured using the produced magnetic tape for evaluation.

Mr·t in thickness direction of magnetic layer, magnetic coercive force, and squareness ratio A hysteresis curve of the magnetic tape for evaluation was obtained using a vibrating sample magnetometer "VSM-P7" (product name) manufactured by TOEI INDUSTRY CO., LTD. Mr·t in the thickness direction of the magnetic layer, the magnetic coercive force, and the squareness ratio were obtained based on the above-described hysteresis curve. Specifically, the magnetic tape for evaluation was cut into a circle having a diameter of 8 mm to prepare a cut sample, 20 cut samples were stacked with the thickness direction of the magnetic tape coinciding with the direction in which the external magnetic field was applied, so as to prepare a measurement sample. As a data plot mode of the vibrating sample magnetometer, the applied magnetic field was set to −16 kOe to 16 kOe, a time constant TC was set to 0.03 sec, the drawing step was set to 6 bits, and the wait time was set to 0.3 sec.

N1/0.5 and N2/0.5

As shown in FIG. 2, the straight line W and the straight line L were displayed on a photograph obtained by imaging the surface of the magnetic layer using a scanning electron microscope (SEM) "S-4800" manufactured by HITACHI Ltd. with an acceleration voltage of 2 kV, 10000-fold (10 k-fold) magnification, and an observation condition of U-LA100, N1 and N2 were obtained using the above-described method, and N1/0.5 and N2/0.5 were obtained from those values.

Specifically, images at 10 k-fold magnification were captured in 5 fields of view (five images in total) at different locations on the surface of the magnetic layer, one straight line W and one straight line L were displayed on each image, a value obtained by dividing an N1 average value of the five straight lines W by 0.5 μm was deemed to be N1/0.5, and a value obtained by dividing an N2 average value of the five straight lines L by 0.5 μm was deemed to be N2/0.5.

Spacing of Magnetic Layer

Spacing was measured using a TSA (tape spacing analyzer) manufactured by Micro Physics after the surface of the magnetic layer was cleaned using n-hexane.

Specifically, the pressure at which the magnetic layer was pressed against a glass plate using a urethane hemisphere was 0.5 atm ($5.05 \times 10^4$ N/m). A certain region (240000 to 280000 $\mu m^2$) of the surface of the magnetic tape for evaluation on the magnetic layer side was irradiated through the glass plate with white light from a stroboscope in that state, the light reflected therefrom passed through an IF filter (633 nm) and an IF filter (546 nm) and was received by a CCD, and thereby an interference fringe image caused by the unevenness of that region was obtained.

Next, that image was divided into 66000 points and distances from the glass plate at each point to the surface of the magnetic layer were obtained and used as a histogram (frequency curve), the histogram was formed into a smooth curve through lowpass filter (LPF) processing, and the distance from the glass plate at the peak position to the surface of the magnetic layer was deemed to be the spacing.

Also, optical constants (phase, reflectance) of the surface of the magnetic layer that was used to calculate the above-described spacing were measured using a reflective spectral film thickness meter "FE-3000" manufactured by OTSUKA ELECTRONICS, CO., LTD., and a value near a wavelength of 546 nm was used.

The magnetic tape for evaluation was cleaned using n-hexane through ultrasonic cleaning at room temperature for 30 minutes by immersing the magnetic tape for evaluation in n-hexane.

Output Properties

An inducible/GMR complex magnetic head having a writing track width of 5 $\mu m$ and a readout track width of 2.3 $\mu m$ was attached to a linear tape electromagnetic conversion property measurement apparatus that was produced by modifying an LTO drive, and evaluation was performed by recording signals having a recording wavelength of 200 nm (G7×1.05-fold linear recording density) in the magnetic tape at a tape speed of 1.5 m/sec.

The apparatus had a traveling system in which magnetic heads are attached at two locations, and thus two magnetic heads described above were attached. The magnetic heads were placed on a precise piezo stage (having a movement resolution of 10 nm) that was movable in the track width direction, the upstream magnetic head recorded signals and the downstream magnetic head eliminated an alternating current in one instance of traveling, and signals having a magnetization width of 0.8 $\mu m$ were produced on the magnetic tape by offsetting the upstream magnetic head and the downstream magnetic head in the track width direction by 0.8 $\mu m$.

Next, after signals were reproduced by causing the magnetic tape to travel again, and the reproduced signals were amplified using a commercially available read amplifier for an MR head, a basic wave component output (S) of the signals and integral noise (N) from a frequency of the basic wave component output to a frequency of two times the basic wave component output were measured using a spectrum analyzer "N9020A" manufactured by Keysight Technologies (formerly, Agilent Technologies, Inc.). The above results are indicated using relative values (dB) using the S/N ratio of Comparative Example 1 as the standard (0 dB).

Length of Magnetization in Width Direction of Magnetic Layer

The length of magnetization in the width direction of a signal recorded in the magnetic layer when the above-described output properties were measured was measured as follows. That is, the length of the magnetization in the width direction of the magnetic layer on which signals are recorded was measured using a frequency detection method and "NANO SCOPE III" manufactured by Digital Instruments Corporation as a magnetic force microscope. A probe having cobalt alloy coating (the radius of curvature of the tip: 25 to 40 nm, magnetic coercive force: about 400 [Oe], magnetic moment: about $1 \times 10^{-13}$ emu) was used as the measurement probe, the scanning range was 5 $\mu m \times 5$ $\mu m$, and the scanning speed was 5 $\mu m$/sec.

The evaluation results above are shown in Tables 8 and 9.

TABLE 8

| | Length of magnetization in width direction ($\mu m$) | Mr · t ($\mu T$ · m) | Squareness ratio in thickness direction | N1/0.5 | N2/0.5 | Average particle diameter of magnetic particles (nm) |
|---|---|---|---|---|---|---|
| Working Example 1 | 0.8 | 0.0013 | 0.70 | 70 | 75 | 14 |
| Working Example 2 | 0.8 | 0.0032 | 0.70 | 71 | 82 | 14 |
| Working Example 3 | 0.8 | 0.0020 | 0.70 | 83 | 90 | 12 |
| Working Example 4 | 0.8 | 0.0020 | 0.75 | 67 | 76 | 14 |
| Working Example 5 | 0.8 | 0.0020 | 0.70 | 60 | 60 | 16 |
| Working Example 6 | 0.8 | 0.0020 | 0.66 | 68 | 78 | 14 |
| Working Example 7 | 0.8 | 0.0020 | 0.70 | 73 | 81 | 14 |
| Comparative Example 1 | 0.8 | 0.0010 | 0.70 | 72 | 79 | 14 |
| Comparative Example 2 | 0.8 | 0.0034 | 0.65 | 66 | 60 | 14 |
| Comparative Example 3 | 0.8 | 0.0020 | 0.63 | 70 | 80 | 14 |
| Comparative Example 4 | 0.8 | 0.0020 | 0.70 | 56 | 58 | 18 |

TABLE 8-continued

|  | Length of magnetization in width direction (μm) | Mr · t (μT · m) | Squareness ratio in thickness direction | N1/0.5 | N2/0.5 | Average particle diameter of magnetic particles (nm) |
|---|---|---|---|---|---|---|
| Comparative Example 5 | 0.8 | 0.0020 | 0.70 | 59 | 57 | 14 |
| Comparative Example 6 | 0.8 | 0.0020 | 0.70 | 58 | 59 | 12 |

TABLE 9

|  | Magnetic coercive force in thickness direction (Oe) | TSA spacing (nm) | SN ratio |
|---|---|---|---|
| Working Example 1 | 3200 | 10 | 0.9 |
| Working Example 2 | 3200 | 10 | 0.5 |
| Working Example 3 | 3200 | 10 | 2.9 |
| Working Example 4 | 3200 | 10 | 1.6 |
| Working Example 5 | 3200 | 10 | 1.0 |
| Working Example 6 | 2800 | 10 | 1.2 |
| Working Example 7 | 3200 | 14 | 0.6 |
| Comparative Example 1 | 3200 | 10 | 0.0 |
| Comparative Example 2 | 3200 | 10 | 0.1 |
| Comparative Example 3 | 3200 | 10 | 0.3 |
| Comparative Example 4 | 3200 | 10 | −0.5 |
| Comparative Example 5 | 3200 | 10 | −0.3 |
| Comparative Example 6 | 3200 | 12 | −0.2 |

Based on Tables 8 and 9, it was found that the SN ratios of Working Examples 1 to 7 according to the present invention were higher than those of Comparative Examples 1 to 6.

In Working Example 1, the magnetic coating material was applied with the amount of cyclohexanone, methyl ethyl ketone, and toluene that were the solvent components in the magnetic coating material components (2) reduced from the conventional 100 parts to 65 parts in order to increase the density of magnetic particles, and the solid concentration S/S at the time of application increased from the conventional 20 mass % to 23 mass %. By increasing the solid concentration S/S, the viscosity of the magnetic coating material increased and it became difficult to apply a thin magnetic layer, but attempts were made to increase the precision of an applicator, the coater tension was increased from the conventional 2.5 N/inch to 4.5/inch, and the magnetic coating material was applied, and thereby a uniform thin magnetic layer was obtained.

By applying the magnetic coating material with a high solid concentration S/S in this manner, the amount of solvents evaporating during drying was reduced, and a fine magnetic layer was obtained with minute particle powder, such as ε-$Fe_2O_3$ magnetic particles.

In Working Example 2, the value of Mr·t increased due to an increase in the thickness of the magnetic layer to about 2.5 times the thickness of Working Example 1, and the share was smoothly applied from the die lip to the surface layer of the magnetic layer in the longitudinal direction due to a thick magnetic layer, and thus the magnetic layer became fine in the longitudinal direction and N2/0.5 increased.

In Working Example 3, the value of Mr·t increased because the thickness of the magnetic layer was about 1.5 times thicker than in Working Example 1, and re-dispersion treatment was performed on the magnetic coating material using the collision dispersion device, and thus the dispersiveness of magnetic particles increased and N1/0.5 and N2/0.5 increased.

In Working Example 4, the value of Mr·t increased because the thickness of the magnetic layer was about 1.5 times thicker than in Working Example 1, and the strength of the oriented magnetic field was increased compared to Working Example 1, and thus the squareness ratio increased.

In Working Example 5, the value of Mr·t increased because the thickness of the magnetic layer was about 1.5 times thicker than in Working Example 1, and N1/0.5 and N2/0.5 decreased because ε-$Fe_2O_3$ magnetic powder having a larger average particle diameter than in Working Example 1 was used.

In Working Example 6, the value of Mr·t increased because the thickness of the magnetic layer was about 1.5 times thicker than in Working Example 1, and the strength of the oriented magnetic field was reduced compared to Working Example 1, and thus the squareness ratio and the magnetic coercive force decreased.

In Working Example 7, the value of Mr·t increased because the thickness of the magnetic layer was about 1.5 times thicker than in Working Example 1, and the TSA spacing increased because the calendering temperature decreased compared to Working Example 1.

In Comparative Example 1, the value of Mr·t decreased because the thickness of the magnetic layer was reduced compared to Working Example 1.

In Comparative Example 2, the value of Mr·t increased because the thickness of the magnetic layer was about 2.7 times thicker than in Working Example 1 and exceeded 0.0032 μT·m.

In Comparative Example 3, the value of Mr·t increased because the thickness of the magnetic layer was about 1.5 times thicker than in Working Example 1, and the squareness ratio decreased because the strength of the oriented magnetic field decreased compared to Working Example 1.

In Comparative Example 4, the value of Mr·t increased because the thickness of the magnetic layer was about 1.5 times thicker than in Working Example 1, and N1/0.5 and N2/0.5 decreased and were lower than 60 because ε-$Fe_2O_3$ magnetic powder having a larger average particle diameter than in Working Example 1 was used.

In Comparative Example 5, the amount of solvent evaporating in the drying process increased because the solid concentration S/S of the magnetic coating material decreased compared to Working Example 1, and as a result, the magnetic layer became slightly coarse, N1/0.5 and N2/0.5 decreased and were lower than 60.

In Comparative Example 6, $\varepsilon$-Fe$_2$O$_3$ magnetic powder having a smaller average particle diameter was used similarly to Working Example 3, but the minute magnetic particle powder was not sufficiently dispersed because the re-dispersion treatment using the collision dispersion device was not performed, and the amount of the solvents evaporating in the drying process increased because the solid concentration S/S of the magnetic coating material decreased compared to Working Example 1, and as a result, the magnetic layer became slightly coarse, N1/0.5 and N2/0.5 decreased and were lower than 60.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which fall within the meaning and range of equivalency of the claims are intended to be embraced therein.

What is claimed is:

1. A magnetic recording medium comprising:
   a nonmagnetic support body; and
   a magnetic layer containing magnetic particles,
   wherein 0.0013 $\mu$T·m<Mr·t<0.0032 $\mu$T·m is satisfied where Mr is a residual magnetic flux density in a thickness direction of the magnetic layer and t is an average thickness of the magnetic layer,
   a squareness ratio in the thickness direction of the magnetic layer is 0.65 or more,
   if a straight line W having a length of 500 nm and a width of 15 nm is displayed parallel to a width direction of the magnetic layer and a straight line L having a length of 500 nm and a width of 15 nm is displayed parallel to a longitudinal direction of the magnetic layer, on an image obtained by observing a surface of the magnetic layer using a scanning electron microscope at 10 k-fold magnification,
   the straight line W does not intersect a particle having a particle diameter of 50 nm or more and a gap having a maximum width of 50 nm or more on the image, and on the image, the number of magnetic particles that intersect the straight line W is N1, and
   the straight line L does not intersect a particle having a particle diameter of 50 nm or more and a gap having a maximum width of 50 nm or more on the image, and on the image, the number of magnetic particles that intersect the straight line L is N2,
   then, a relationship of N1/0.5>60 and N2/0.5>60 is established where N1/0.5 is the number of magnetic particles per micrometer obtained by dividing N1 by 0.5 $\mu$m and N2/0.5 is the number of magnetic particles per micrometer obtained by dividing N2 by 0.5 $\mu$m.

2. The magnetic recording medium according to claim 1, wherein if a length of magnetization in the width direction of the magnetic layer is set to 1 $\mu$m or less, the length being a length of magnetization of a signal recorded in the magnetic layer, reproduction is performed by a TMR head.

3. The magnetic recording medium according to claim 1, wherein the magnetic particles are made of $\varepsilon$-iron oxide.

4. The magnetic recording medium according to claim 3, wherein an average particle diameter of the magnetic particles made of the $\varepsilon$-iron oxide is 15 nm or less.

5. The magnetic recording medium according to claim 1, wherein a magnetic coercive force in the thickness direction of the magnetic layer is 3000 oersteds [Oe] or more.

6. The magnetic recording medium according to claim 1, wherein when spacing on a surface of the magnetic layer is measured using a TSA (tape spacing analyzer) after the surface of the magnetic layer is cleaned using n-hexane, a value of the spacing is 5 nm or more and 12 nm or less.

7. The magnetic recording medium according to claim 1, wherein a thickness of the magnetic layer is 30 nm or more and 200 nm or less.

* * * * *